Dec. 12, 1933.     C. D. SHIMERDA     1,938,869
FOUR-WAY VALVE
Filed April 16, 1928     2 Sheets-Sheet 1

Inventor
Carrol D. Shimerda
By J. M. St. John
Attorney

Dec. 12, 1933.   C. D. SHIMERDA   1,938,869
FOUR-WAY VALVE
Filed April 16, 1928   2 Sheets-Sheet 2

Inventor
Carrol D. Shimerda
By J. M. St. John
Attorney

Patented Dec. 12, 1933

1,938,869

UNITED STATES PATENT OFFICE 1,938,869

FOUR-WAY VALVE

Carrol D. Shimerda, Cedar Rapids, Iowa, assignor to Laplant Choate Manufacturing Co., Inc., Cedar Rapids, Iowa, a corporation of Delaware Application April 16, 1928. Serial No. 270,308

5 Claims. (Cl. 277—69)

This invention relates to valves employed to divert the flow of liquids through a variety of pipe systems, the invention being designed more specifically for regulating and distributing the flow of oil to and from a group of hydraulic jacks.

In the operation of snow-plows especially, it is common to use three hydraulic jacks in connection with the plow-operating tractor, one being employed to elevate the V nose of the plow, and the other for lifting the wings disposed at each side of the tractor. The present type of valve, and the installation of one for each jack involves a complicated system of piping, on the one hand, and does not give to the operator of the plow the simple and easy control of the various plow elements desired. The invention herein described greatly simplifies installation, and makes it possible for one man to easily control the working elements of the plow, singly or jointly, and in any desired order.

The invention is fully disclosed in the description and claims following, reference being had to the accompanying drawings, in which:—

Figure 1:
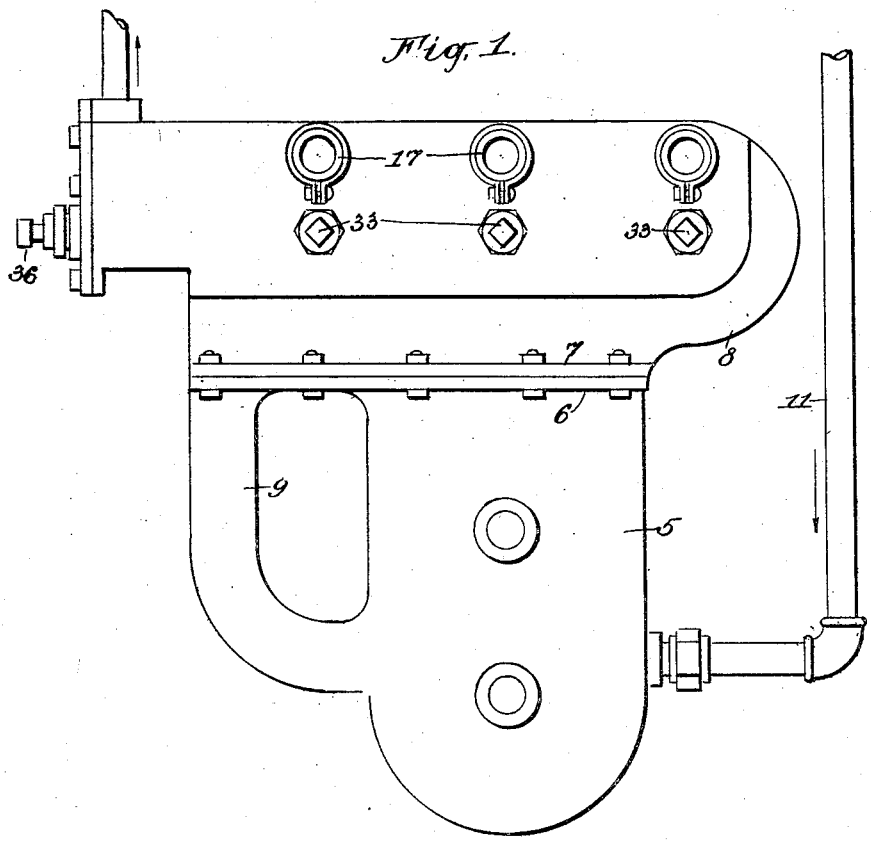
Figure 2:
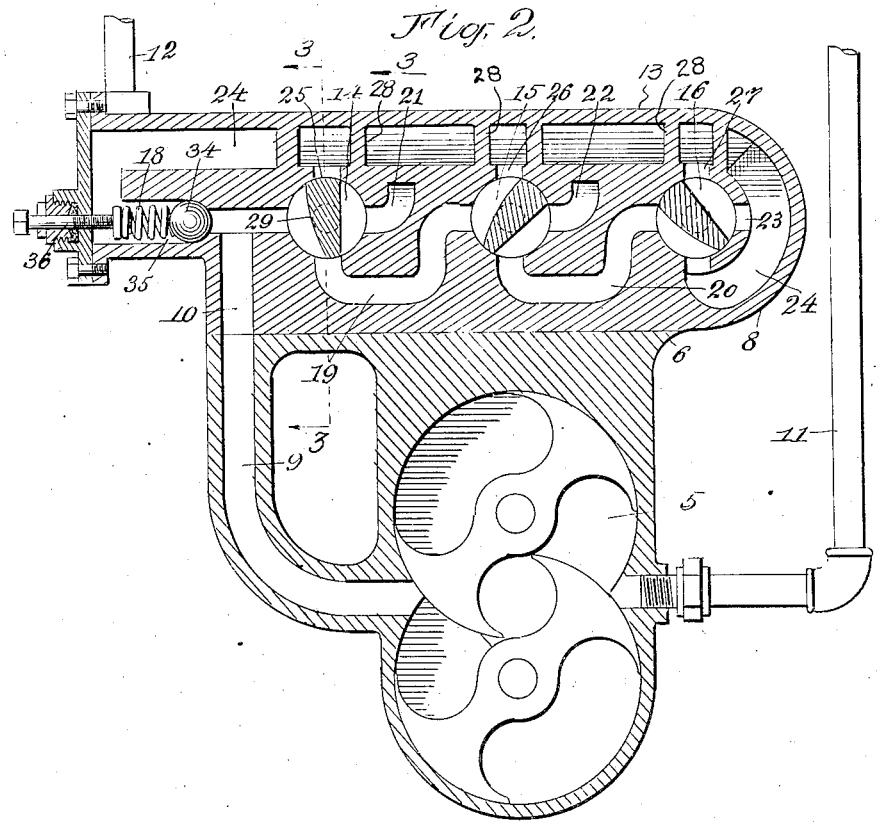
Figure 3:
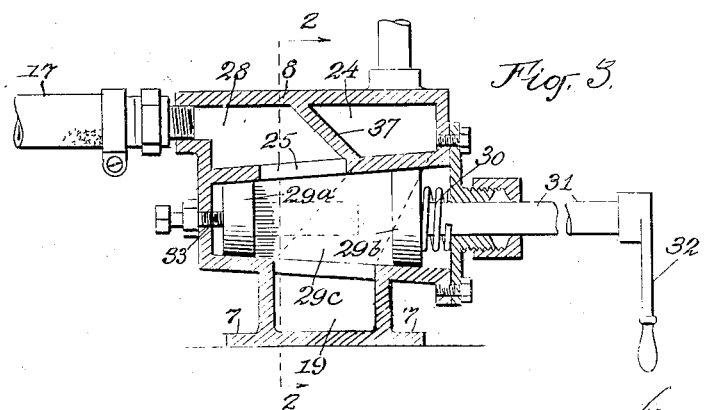

Fig. 1 is a side elevation of a valve unit, with pump attached, as applicable to a snow-plow, or analogous machine using three hydraulic jacks. The view is of the jack side of the valve, which in general practice looks toward the front end of the tractor and plow. Fig. 2 is a sectional view in the plane of the line 2—2 of Fig. 3. Fig. 3 is a cross-section of the valve structure detached from the pump, in the line 3—3 of Fig. 2.

In the drawings, the numeral 5 denotes a rotary pump, which forms a part of a tractor's equipment when employed for plowing snow, or the like, the tractor supplying the power for operating the pump. Herein the pump and the valve structure to be described presently are shown joined in a close and compact assembly quite desirable structurally. The valve assembly may, however, be remote from the pump, and connected thereto in the ordinary way by piping. In the embodiment shown, the flanged upper end of the pump 6 is bolted to the flanged base 7 of the valve casing 8. The outlet from the pump is a branch conduit 9 communicating directly with the valve inlet 10. The pump supply pipe 11, and the return pipe 12 from the valve assembly are supposed to connect with a storage tank (not shown), with which the tractor is equipped. It is assumed that the pump is, or may be, in constant operation.

A valve casing or shell 13 is provided with three valves, 14, 15 and 16, each one designed to serve a jack (not shown) through a flexible hose 17, a separate jack and hose for each valve. These valves are of the four-way type, each having an inlet port, a service port, and two outlet ports. The inlet to the first valve of the series, 14, is in direct connection with the pump. The inlets to the valves 15 and 16 are numbered 19 and 20, respectively, and are outlets to preceding valves in the series. The other outlets, 21, 22 and 23 lead directly to the main return chamber 24. The service ports 25, 26 and 27 communicate directly with their respective jacks through the separate hoses 17, partitions 28 being located to insure that the fluid moving through a particular service port will be delivered only to that jack which is controlled by the adjacent valve. As shown clearly in Fig. 3, the return chamber 24 is separated from the passages communicating the service ports with their respective hoses by a partition 37.

In practice a valve plug or stop-cock 29 of a special type is used. This has a tapered body, as shown in Fig. 3, with frustro-conical ends 29a and 29b connected by a web 29c. The plug is held snugly in place by a compression spring 30, and has an operating stem 31 provided with a hand-lever 32. At the smaller end a set-screw 33 provides for nice adjustment of the plug, and serves for loosening it in the event of its becoming stuck in its seat. It will be noted that in cross-section the web is tapering or wedge-shaped, one side being wide enough to more than cover a port, as shown in Fig. 2, and the other side narrower than a port. The effect of this, in connection with the group of four-way valves is illustrated in Fig. 2. It may be assumed that oil has been delivered to the jack served by valve 14, the valve having been turned to the position shown at valve 15, and thence to the position illustrated, holding the pressure on the jack. At the same time the pressure oil may flow to the second jack through 15. This pressure may be held in the same manner as at 14, when valve 16 may be served. Thus all of the jacks may be served successively, and in any order by a proper manipulation of the hand levers. And it will be evident that pressure may be maintained on any or all the jacks, and such pressure released as to any or all of them, and in any order of manipulation. This makes it possible for the operator at the levers to control such a machine as a snow-plow with great facility and ease.

The flow of oil being constant, a necessary adjunct to the valve assembly is a by-pass yielding at the maximum working pressure. This is shown as a ball-valve 34 seated in a branch conduit 35 communicating with the return port, the valve being held to the desired pressure by a spring 18 and a regulating screw 36. In case of excess pressure due to the closing of any of the service valves the by-pass valve yields, and allows the pumped oil to reach the storage tank by the return pipe, and the continuity of the oil circulation is unbroken.

Having thus described my invention, I claim:—

1. A four-way valve having a plurality of ports disposed at the quarters thereof, said ports being arranged as an inlet port, a service port, and two outlet ports, and a rotary closure having a wedge section forming a pair of oppositely disposed valve surfaces of unequal area, one side of the closure being substantially parallel to the diameter thereof, said closure being adapted by shifts of position to place the inlet and service ports in communication, to close the service port by the valve surface of larger area while uncovering the inlet port by the valve surface of smaller area to thereby connect the same with one of the outlet ports, and to connect the service port with the other outlet port.

2. A valve assembly comprising a group of four-way valves, each having an inlet port, a service port, and two outlet ports, one of the outlet ports for each valve except the last valve in the direction of flow through the assembly serving as the inlet port for the succeeding valve in the group, and closures, one for each of said valves, adapted by shifts of position to connect the inlet and service ports of the respective valves successively, to close any service port, and to open any service port through the other outlet port.

3. A valve assembly comprising a group of four-way valves each having an inlet port, a service port, and two outlet ports, one of the outlet ports for each valve except the last valve in the direction of flow through the assembly serving as the inlet port for the succeeding valve in the group, and a retaining shell for said valve group formed as a single structure having passages for connecting the several valves, a main inlet port, and a general outlet chamber connecting with all outlet ports.

4. A valve assembly comprising a group of four-way valves each having an inlet port, a service port, and two outlet ports, one of the outlet ports for each valve except the last valve in the direction of flow through the assembly serving as an inlet port for the succeeding valve in the group, and closures, one for each of said valves, adapted by shifts of position to selectively open the inlet and service ports of the several valves, to close any service port, and to open any service port to the other outlet.

5. A valve assembly comprising a series of four-way valves, each having an inlet port, a service port, and two outlet ports, a by-pass pressure valve, and a shell formed to retain all of said valves having a primary inlet port to the first valve of the series, a branch passage for the by-pass valve, passages connecting the outlet port of one valve with the inlet port of a succeeding valve, and a chamber in communication with all outlet ports.

CARROL D. SHIMERDA.